United States Patent [19]
Strozyk

[11] Patent Number: 5,193,834
[45] Date of Patent: Mar. 16, 1993

[54] INTRAFRAME FOLDING BICYCLE

[76] Inventor: John S. Strozyk, Reinholdstrasse 11, Hannover, Fed. Rep. of Germany

[21] Appl. No.: 663,831

[22] PCT Filed: Sep. 25, 1989

[86] PCT No.: PCT/EP89/01106
§ 371 Date: Mar. 19, 1991
§ 102(e) Date: Mar. 19, 1991

[87] PCT Pub. No.: WO90/03300
PCT Pub. Date: Apr. 5, 1990

[30] Foreign Application Priority Data
Sep. 27, 1988 [DE] Fed. Rep. of Germany ....... 3832687

[51] Int. Cl.$^5$ ............................................. B62K 15/00
[52] U.S. Cl. ................................... 280/278; 280/287; 280/284
[58] Field of Search ................ 280/278, 287, 281.1, 280/284, 30

[56] References Cited
U.S. PATENT DOCUMENTS

| | | | |
|---|---|---|---|
| 4,022,485 | 5/1977 | Cox | 280/287 |
| 4,429,890 | 2/1984 | Hon | 280/287 X |
| 4,440,414 | 4/1984 | Wang | 280/287 |
| 4,441,729 | 4/1984 | Underwood | 280/278 |
| 4,842,292 | 6/1989 | Wang | 280/287 |
| 5,069,468 | 12/1991 | Tsai et al. | 280/278 |

FOREIGN PATENT DOCUMENTS

| | | | |
|---|---|---|---|
| 2651305 | 11/1978 | Fed. Rep. of Germany | 280/287 |
| 1011990 | 4/1952 | France . | |
| 628783 | 2/1963 | France . | |
| 608432 | 9/1948 | United Kingdom . | |
| 1571849 | 7/1980 | United Kingdom . | |
| 2144687 | 3/1985 | United Kingdom | 280/278 |

Primary Examiner—Margaret A. Focarino
Assistant Examiner—Kevin Hurley

[57] ABSTRACT

With the bicycle in its normal standing position, the front fork (16) with its front wheel (6) is, by means of the handle bar assembly (700), turned 180° to the rearward direction, and in this position it is blocked from turning, in that the handle bar elements (701, 702) are folded down, each against its respective upper frame member. The left crank arm subassembly (500) is removed. The rear wheel, after being loosened, is then slided forward on two guide tracks, and then tightened again. Thereafter, the front wheel (6) is removed. The front frame subassembly (300) and the rear frame triangle subassembly (200) are then turned into each other, about pivot bearing (203), whereby as the two subassemblies are turned, the two lower front frame member come between the two seat pillars and two rear fork members, and the rear wheel comes between the two lower front frame members, and then between the two upper front frame members, until the end position is reached. The total elapsed time is about 45 seconds.

16 Claims, 6 Drawing Sheets

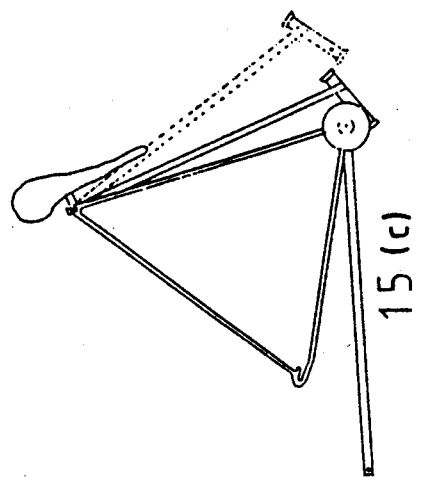
15 (c)
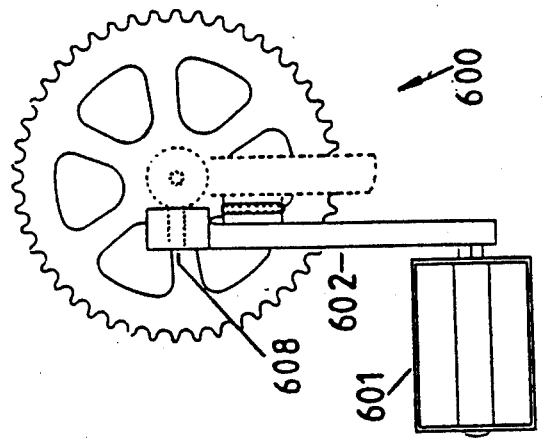
Fig 14
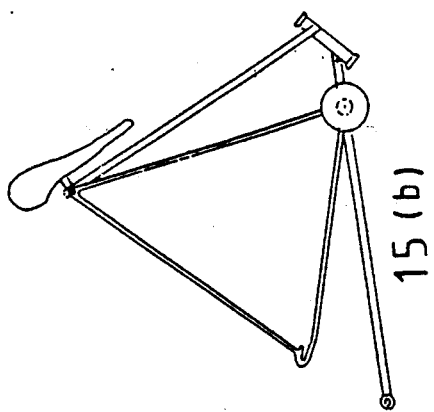
15 (b)
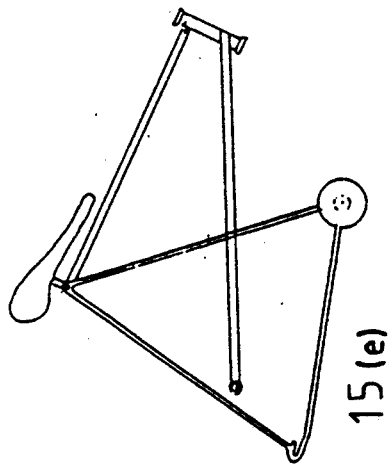
15 (e)
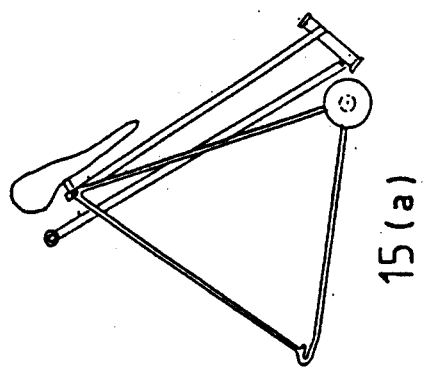
15 (a)
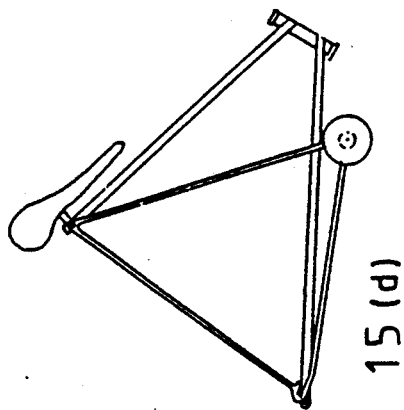
15 (d)

INTRAFRAME FOLDING BICYCLE

1. FIELD OF THE INVENTION

This invention relates to folding bicycles that are of standard size and which can be quickly folded for transport in a car, airplane, or bus, or which can be stored in a minimum amount of space.

2. PRIOR ART

The bicycles of the prior art when folded require considerable space. For example in U.S. Pat. No. 4,441,729 to Underwood, considerable space lies between the rear wheel and the seat tube.

3. INVENTION

The present invention reduces the volume of the folded bicycle to an area roughly equal to that of the rear wheel, and to a width approximately equal to the width of the rear fork of the bicycle. This is accomplished by mounting the rear wheel axle inside of the two rear wheel triangles of the bicycle frame, so that the rear wheel can be moved forward inside of the two triangles. The separable coaxially constructed front chainwheel axle hub, allows the rear wheel to be moved even further forward, while at the same time offering a means of separating the front frame members from the hub. The split seat tube allows the rear wheel to be moved yet even further forward, between the right and left seat tubes, and at the same time allows the front frame to be folded into the rear frame between the two seat tubes about their common axis, with the rear wheel between the front frame members.

DESCRIPTION OF DRAWINGS

In the figures of the drawings, like reference numerals identify like components and in those drawings:

FIG. 14 is a view of a folding right crank arm with pedal FIG. 15a-e show the various possible configurations of the folding bicycle.

DESCRIPTION OF THE PREFERRED EMBODIMENT

Figure 1:
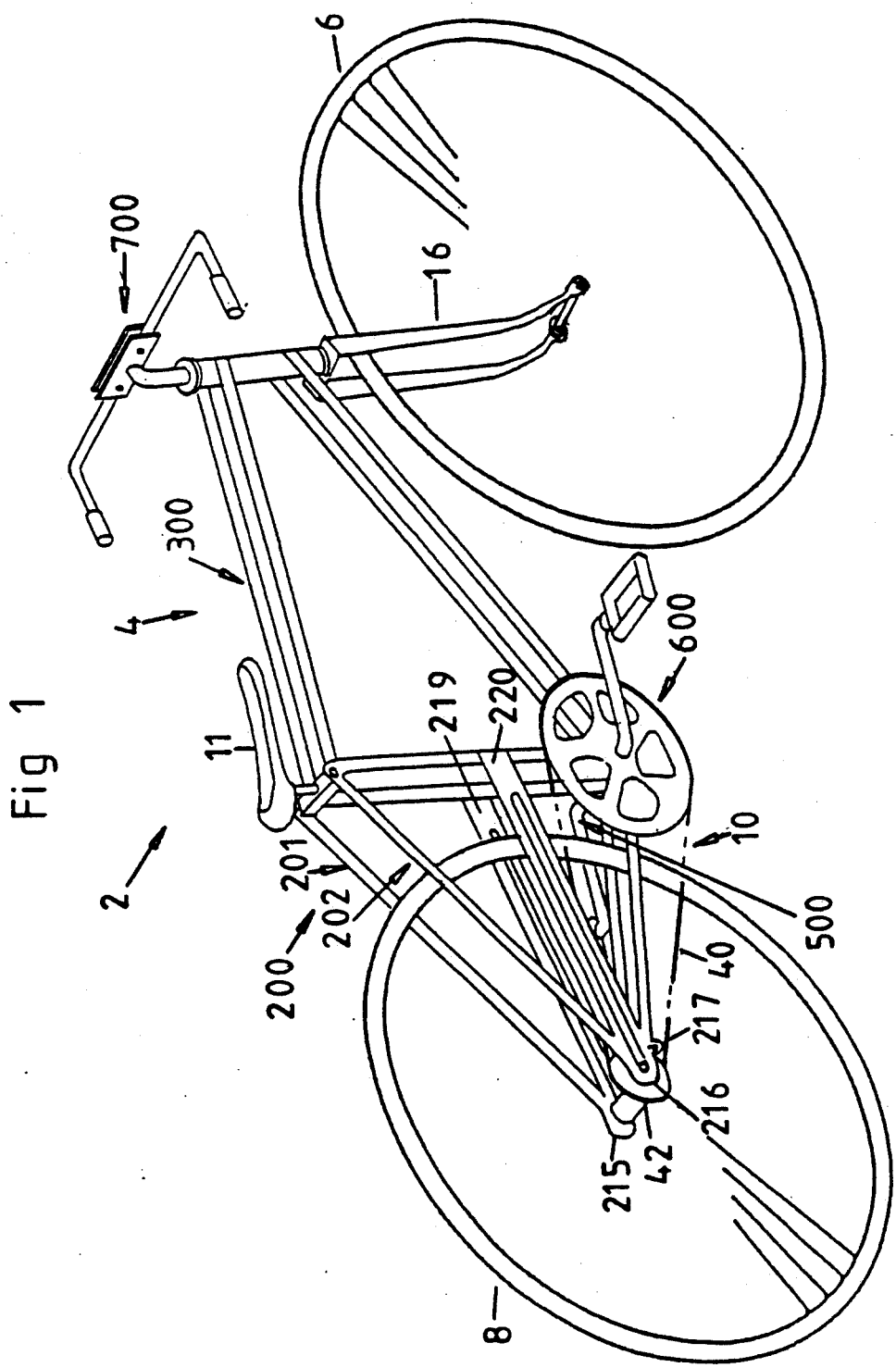
FIG. 1 is a perspective view of the bicycle in its operable mode.

The drawings show a bicycle 2, with frame 4, a front wheel 6, a rear wheel 8, a seat 11, a handle bar assembly 700, a front fork 16, and a rear wheel drive system 10.

The frame 4, consists of a front frame subassembly 300 and a rear frame triangle subassembly 200.

The front frame subassembly 300, consists of, laterally spaced and symmetrically orientated with respect to the vertical plane of the bicycle, two upper frame members 301, 302 with their respective front ends fastened to the upper end of the front fork hub 313, and two lower frame members 303, 304, with their respective upper ends fastened to the lower end of the front fork hub.

The space between the two upper frame members 301 and 302 and between the two lower frame members 303 and 304 is such that the rear wheel tire can pass between these members. The outside width of the upper frame member pair 301, 302, and the lower frame member pair 303, 304, is such that each pair can pass between the rear wheel triangles 201 and 202, of the rear frame triangle subassembly 200.

The rearwardmost end of each upper frame member 301, 302 is fastened to a pivot block 311 that defines a lateral bore 312, capable of receiving the pivot bushing 203 of the rear frame triangle subassembly, whereby a bearing is created, consisting of the bore 312 and bushing 203, pivotally joining together the front frame subassembly 300 and the rear frame triangle subassembly 200. The pivot block serves also as fastening point for either the adjustable seat support 3 or unadjustable seat support 5.

The right inner element 404, of the front chainwheel axle hub subassembly 400, is fastened to the lower end of the right lower frame member 304 of the front frame subassembly while the left inner element 403 is fastened to the lower end of the left lower frame member 303.

The front fork hub 313 is outfitted with a ball bearing assembly as known in the prior art, in which the front fork 16 is mounted.

The rear frame triangle subassembly 200 consists of left and a right triangle, respectively 201 and 202, a pivot bushing 203, with an axial bore 204, and a rear frame connecting bolt 205. In the uppermost corner of the left triangle 201 is a threaded bore 207, and in the uppermost corner of the right triangle 202 is a bore without threads. The pivot bushing 203 is mounted between bores 207, 208, of the two triangles 201, 202, axially perpendicular to the vertical plane of the bicycle, and is the receiving means for the pivot block 311 of the front frame subassembly 300. The rear frame connecting bolt 205 is fed first through the bore 208, then through the bore 204 in the pivot bushing 203 and then screwed into the bore 207, whereby the two triangles are laterally fastened together with the pivot bushing as in between spacer.

Each triangle 201, and 202, consists of its respective seat pillar 209, 210, its respective seat strut member 211, 212, and its respective rear fork member 213, 214, as well as of its respective rear wheel receiving means 215, 216, where the receiving slot opens inside of the respective triangle, and of its respective front chain wheel hub outer element 401, 402.

In the vicinity of right rear wheel receiving means 216, the right rear frame triangle 202 is furnished with a fastening means 206, capable of receiving the chainholder 217. The chainholder holds the drive chain 40, so that the drive chain, in a position ready for operation, is automatically caught by the rear wheel sprocket 42, when the rear wheel 8 is, from its forward stowed position, translated to the operable position. In the operable mode, the chain holder does not contact the drive chain.

Between the respective rear wheel receiving means 215 and 216, of each rear frame triangle 201 and 202, and each corresponding seat pillar 209 and 210, parallel to the vertical plane of the bicycle, each rear frame triangle is provided respectively with a slotted rear wheel guide 219 and 220, where the respective slot 221 and 222 is a continuation of the slot of the rear wheel receiving means, along which the rear wheel axle, with the rear wheel, can be translated, when the bicycle is folded or unfolded.

The rear wheel guides 219 and 220 have the additional function, that in combination with the rear wheel fastened tightly to the guides in the forward position, of holding the two rear frame triangles 201 and 202 together, when the lower frame members 303 and 304 with their respective thereto fastened inner elements 403 and 404 are separated from the rear frame subassembly 200.

Figure 10:
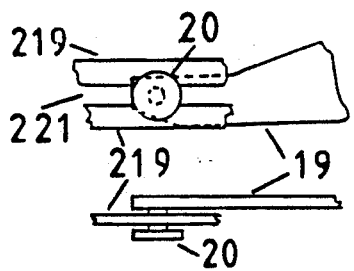
FIG. 10 is a detail of the coaster brake arm connection with bicycle frame.

If the bicycle has a rear wheel with a coaster brake, the coaster brake arm 19 is not fastend to the bicycle frame as known in the prior art, but instead by means of a glide bushing 20, see FIG. 10 it is captured in the slot 221 of the rear wheel guide 219, in such a way that when the rear wheel is translated forward or backwards, the brake arm slides along with the wheel by means of the glide bushing captured in slot 221.

Figure 4:
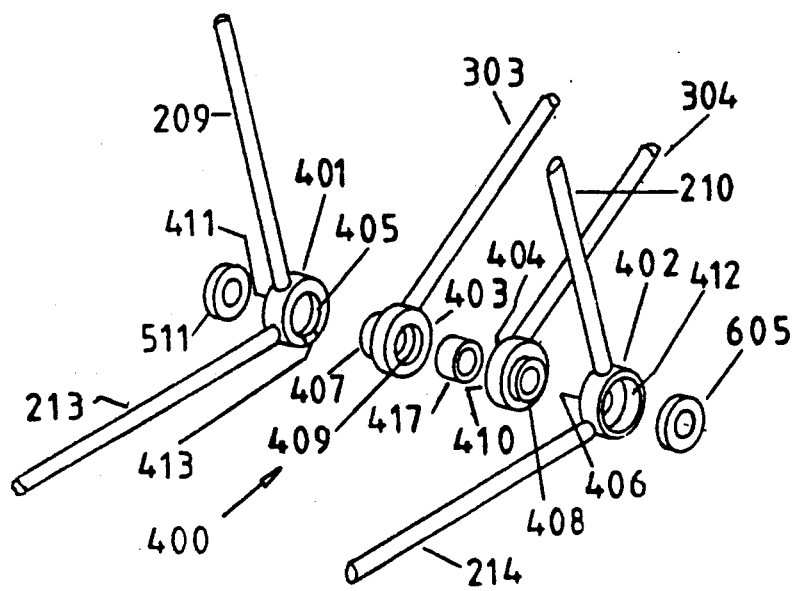
FIGS. 4, 5 and 11 are detail drawings of the front chainwheel axle hub subassembly and associated various elements.

The front chainwheel hub subassembly 400 consists of five separable coaxial mating members, the left and right outer element respectively 401 and 402, the left and right inner element respectively 403 and 404, and a middle element 417. See FIG. 4. By means of seat 405 and 406 in the respective inner side of the outer element 401 and 402, which mate with the respective annular protrusion 407 and 408 on the outer side of the respective inner element 403 and 404, and by means of the seat 409 and 410 in the inner side of the respective inner element 403 and 404, mating with the diameter of the middle element 417, the five members are coaxially assembled. This coaxial subassembly, when axially pulled together, guarantees the concentricity of the front chainwheel axle hub subassembly by a full loaded frame, and only a small axial force is required to hold the assembly together. The assembly and disassembly of the hub is achieved with a minimum of effort.

Figure 11:
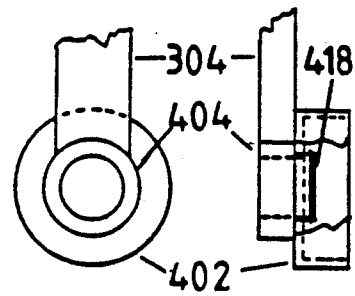

With the above described chainwheel hub subassembly it is possible to mount the inner elements 403 and 404 in their respective outer element 401 and 402, so that the inner elements 403 and 404 can be turned. In this case the respective annular protrusion 407 and 408 are held captive in their respective outer element 401 and 402 by means of a spring ring 418, see FIG. 11. This alternative is necessary to allow the bicycle configuration shown in FIG. 15c. By certain bicycle frame dimensions the bicycle configuration shown in FIG. 15d is not realizable.

Figure 5:
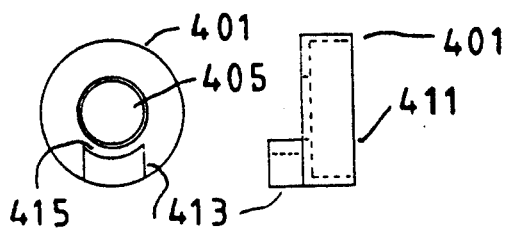

On the inner side of each respective outer element 401 and 402 are mounted respectively detent block 413 and 414, see FIG. 5, each respectively defining semicircular socket 415 and 416. The radius of each socket is equal to the major radius of each respective inner element 403 and 404, whereby, when by unfolding the bicycle, just before engagement, the respective inner elements contact each respective detent block creating a resistance to the turning, and by turning the front frame subassembly and rear frame subassembly, with respect to one another, further apart, the resistance offered by the lower frame members 303 and 304 is overcome, and each respective inner element snaps into each respective socket of the corresponding detent block. An outward axial preloading, with respect to the inner elements, of the lower frame members, forces each respective inner element axially into each respective outer element, whereby a rigid connection between the front frame subassembly and rear frame subassembly is established.

The chain drive system 10 of the bicycle consists of essentially a front chainwheel(s), two crank arms with pedals, an axle, a drive chain 40, and a rear wheel sprocket 32. Two axial separable sub-assemblies, the left crank arm subassembly 500 and the front chainwheel subassembly 600, make the up front part of the drive system.

Figure 6:
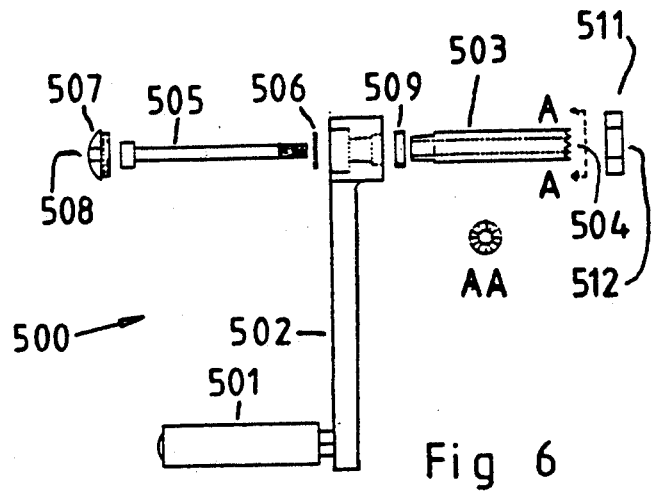
FIGS. 6 to 9 are detail drawings of the various crank arm subassemblies.

The left crank arm subassembly 500, see FIG. 6, consists of a left pedal 501, a left crank arm 502, a left crank arm axle 503, a front chainwheel axle hub connecting bolt 505, a spring washer 506, a dust cap 507, a distance ring 509 and a ball bearing 511. The axle 503 defines a bore 504 capable of receiving the connecting bolt 505. The spring washer 506 lies under the head of the connecting bolt 505.

The dust cap 507, which defines an axial bore 508, is screwed into the left crank arm as known in the prior art. Since the diameter of the bore 508 is smaller than the diameter of the head of the connecting bolt 505, but large enough to allow the entrance of an Allen wrench, the bolt 505, and washer 506 are held captive in the left crank arm subassembly 500, and the bolt can be turned. See FIG. 8. The threaded end of bolt 505 extends beyond the end of axle 503, so that bolt 505 can be screwed into an appropriate threaded bore in the front chainwheel subassembly 600. The axle 503, in FIG. 6, is provided with a radial tooth connection, mating with the radial tooth connection on the axle 603 shown in FIG. 7.

The ball bearing 511 is pressed into the bearing seat 411 of the chainwheel axle hub subassembly 400. The axle 503 is of such a diameter, that it can be pushed through the inner ring of ball bearing 511 until the distance ring 509 touches the outside periphery of the inner ring. By means of bolt 505, the left crank arm subassembly 500 is connected to the chainwheel subassembly 600.

An alternative to the above (not shown), is to mount the ball bearing 511 on the axle 503 with the distance ring 509 against the periphery of the inner ring of the ball bearing, and then this assembly is pushed into the chainwheel hub, whereby the outer ring of the ball bearing is pushed into the bearing seat 411.

Figure 7:
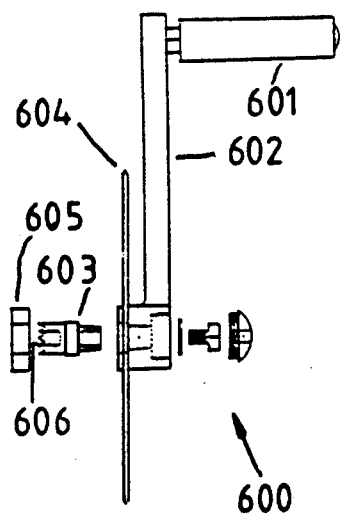
Figure 8:
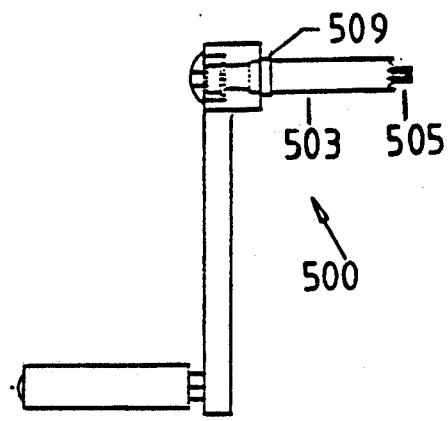

The front chainwheel subassembly 600, see FIG. 7, consists of the front chainwheel axle 603, a front chainwheel(s) 604, the right pedal 601, the right crank arm 602 and ball bearing 605. The front chainwheel is fastened or removably fastened to the axle 603. The right crank arm 602 is fastened or removably fastened, to either the chainwheel 604 or the axle 603. When removably fastened, see FIG. 14, the crank arm 602 can by means of a hinge arrangement, be so attached to the chainwheel assembly 600, that it can be turned 90°, so that the pedal lies parallel to the vertical plane of the bicycle.

Figure 2:
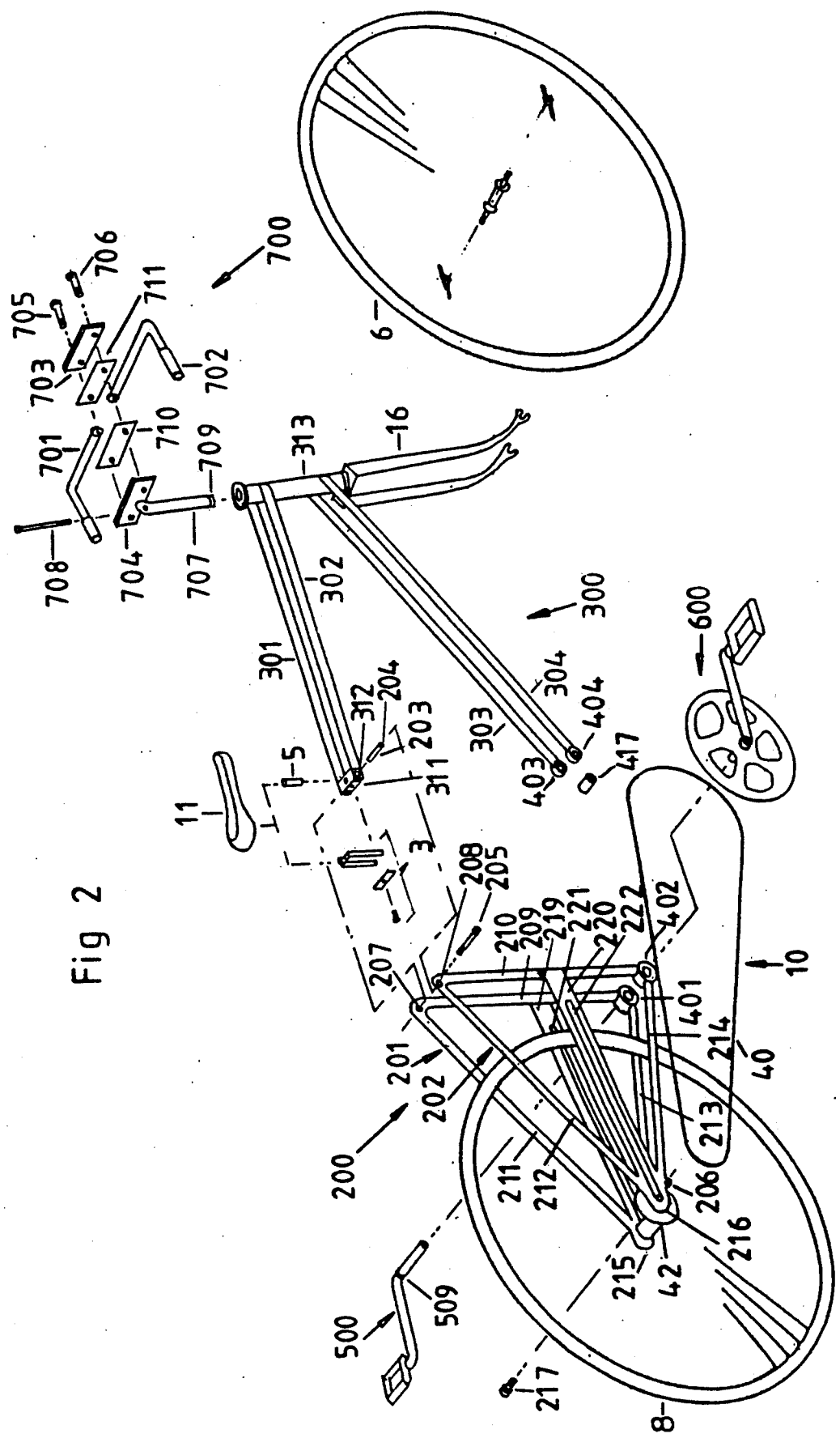
FIG. 2 is an exploded view of the bicycle.
Figure 3:
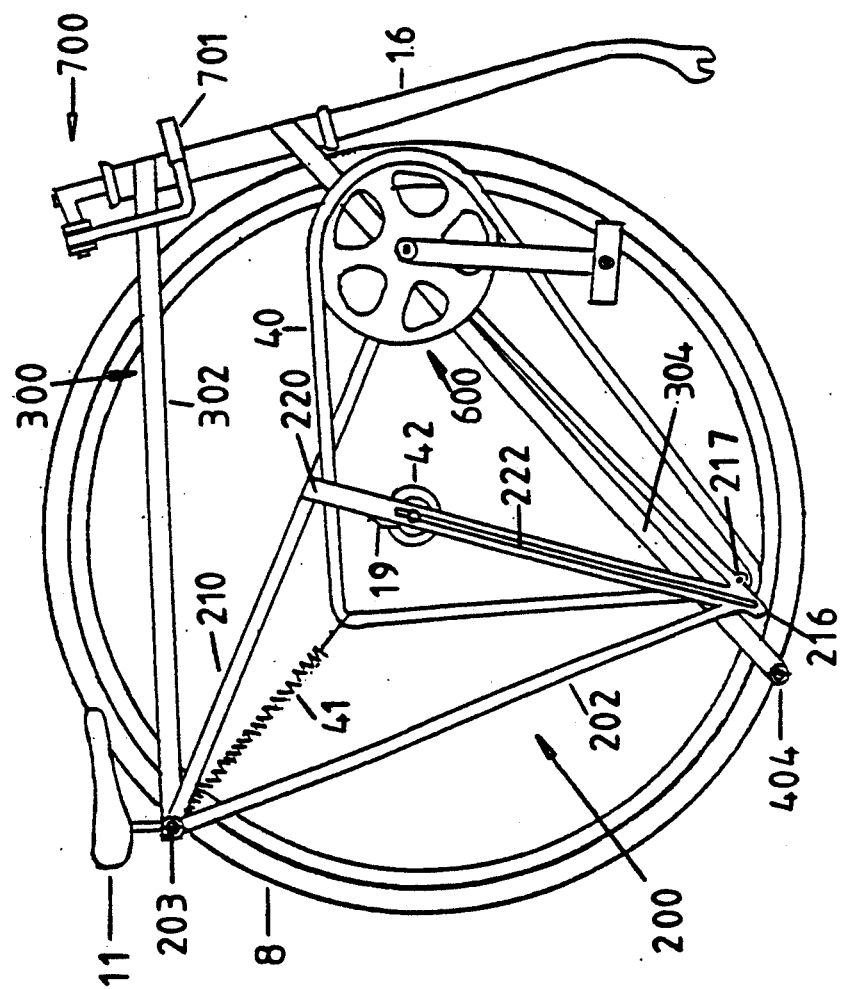
FIG. 3 is an orthographic view of the folded bicycle.

In FIGS. 1, 2, 3 and in FIG. 7, a front chainwheel is shown, with an intergrated crank arm with receiving means for a square cone connection with the axle, as known in the prior art. The axle 603 in FIG. 7, defines a threaded bore 606, capable of receiving connecting bolt 505. The axle 603 is pressed into the inner ring of bearing 605, and to the opposite end, the described chain wheel is connected.

Figure 9:
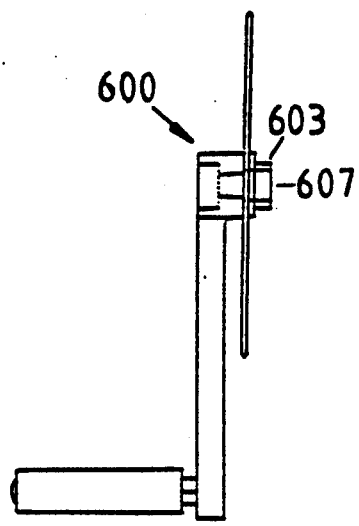

The axle 603 can be solid or hollow, depending upon the choice of connection means between the left crank arm assembly 500 and the front chainwheel subassembly 600. Three connection means are suggested, a square cone connection, or a threaded connection, provided on the free end of the axle 503, which mates with a corresponding receiving means in the chainwheel subassembly 600. A holllow axle 603 is required for both of these connections. See FIG. 9. The third connection means is the radial tooth connection shown in FIGS. 6 and 7. Here a solid axle is preferred.

The axial force necessary to hold the chainwheel axle hub subassembly 400 together, is provided by the chainwheel hub connecting bolt 505. The magnitude of this force is governed by the axial width of the distance ring 509. Through the peripheral contact of the ring 509 on the inner ring of bearing 511, the inner ring of ball bearing 511 and 605 are pulled together, which in turn through the balls of the bearings, the outer rings of bearings are pulled together, and then the chainwheel hub outer elements 401 and 402. By dispensing with a hub connecting bushing, the hub assembly can be fastened with one bolt, however the utilization of a hub connecting bushing can be considered.

The axle assembly consisting of axle 503 and axle 603 touches only the inner ring of bearing 511 and 605 because the inner diameter of the chainwheel axle hub is larger than the diameter of the said axle assembly. The left crank arm subassembly 500 can be easily pushed in and pulled out of the hub, when the bicycle is assembled or disassembled, and fastened or unfastened by means of a single bolt. The chainwheel hub subassembly 400 is self centering, and when engaged, locks the front and rear frames together, thereby permitting the effortless insertion and retraction of the left crank arm subassembly.

By means of ball bearing 605 pressed into the bearing seat 412 of the right outer element 402 of the chainwheel axle hub subassembly, the front chainwheel subassembly 600 is independently mounted to the bicycle frame. When, by folding the bicycle, the left crank arm subassembly 500 is removed from the chainwheel axle hub subassembly, the chainwheel subassembly 600 remains on the bicycle frame.

The handle bar assembly 700 is constructed so that the right and left handle bar elements 701 and 702 can be folded downwards. By means of connecting plate 703 and 704 and bolt 705 and 706 the handle bar elements 701 and 702 are fastened to the handle bar stem 707, that in turn, as known in the prior art, by means of bolt 708 and cone 709 is connected to the front fork 16.

By means of brake lining elements 710 and 711 lying between handle bar elements 701 and 702 and dependent upon the tightening torque applied to bolts 705 and 706, the force required to move handle bar elements 701 and 702 up and down is adjustable. The adjustment is such that handle bar elements 701 and 702 retain the position required for the operable mode, and only by exterting an extremely strong force the handle bar elements can be moved downwards or upwards. A stop is provided, that defines the upward operable position.

By means of the described frictional connection, when the handle bar elements 701 and 702 are folded down and blocked against the respective upper frame member 301 and 302 the front fork 16, with or without the front wheel 6, is blocked against turning.

To fold the bicycle:
1. With the bicycle in its normal standing position, the front fork 16 with its front wheel 6 is, by means of the handle bar assembly 700, turned 180° to the rearward direction, and in this position is blocked from turning, in that the handle bar elements 701 and 702 are folded down, each against its respective upper frame member (3 sec.).
2. With an Allen wrench the front chainwheel axle hub connecting bolt 505 is unscrewed from the front chainwheel subassembly 600, and the left crank arm subassembly 500 is pulled out of the chainwheel axle hub subassembly 400. The middle element 417, which is fastened with a light cord to the bicycle frame, falls out of way, but remains hanging on the frame (15 sec.)
3. The rear wheel after beeing loosened, is slid forward in the slots 221 and 222 of the rear wheel guides 219 and 220 until the rear wheel tire touches the pivot block 311. The front chainwheel now lies over the surface of the rear wheel. The drive chain is held on three points, namely the chainholder 217, the front chainwheel 604 and the rear wheel sprocket 42. The rear wheel is retightened in this forward position, whereby the rear frame triangles 201 and 202 are stabilized (25 sec.)
4. The front wheel is removed (30 sec.)
5. By squeezing the front frame lower members 303 and 304 together, the inner elements 403 and 404 are disengaged from outer elements 401 and 402, so that the front frame subassembly 300, with handle bars, seat, and front fork, can be turned into the rear frame subassembly 200 about the pivot bushing 203, whereby, as the two subassemblies are turned into each other, the two lower front frame members 303 and 304 come between the two seat pillars 209 and 210 and the two rear fork members 213 and 214, and the rear wheel comes between the two front frame lower members 303 and 304 and then the two front frame upper members 301 and 302, until the end position is reached (45 sec.). The total elapsed time is 45 seconds. Optionally, the drive chain can be fastened with spring 41.

Figure 12:
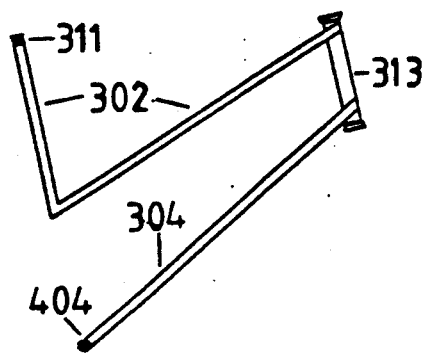
FIG. 12 is an orthographic view of the front frame subassembly of a lady's bicycle
Figure 13:
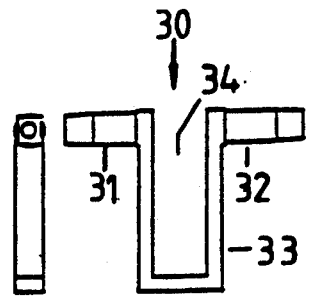
FIG. 13 is a view of a front chainwheel axle.

The development shown in FIG. 12, is the folding lady's bicycle, achieved by a modification of the upper front frame members. Since the depth of the step-through is related to the geometry of the rear wheel, it would be advantageous to mount the upper frame members on the outside of the rear frame subassembly 200 (not shown) in order to realize a deeper step-through. The upper ends of the upper frame members would then be provided with a cross member (not shown), serving as a fastening point for the seat.

The embodiments of the invention in which an exclusive property or privilege is claimed are defined as follows:

1. A folding bicycle assembly comprising:
    a front frame subassembly comprising a front fork hub which defines an upper end and a lower end, therein mounted as known in the prior art a front fork, and comprising further a pivot block, and thereto fastened a bicycle seat,
    and laterally spaced and symetrically orientated to a vertical plane which longitudinally symetrically bisects the bicycle,
        two upper frame members with their respective front ends fastened to the upper end of the front fork hub and their respective rearwardmost ends fastened to the pivot block, and
        a right lower frame member and a left lower frame member, with their respective upper ends fastened to the lower end of the front fork hub and their lower ends fastened to a front chainwheel axle hub subassembly, a rear frame subassembly comprising a right triangle and a left triangle, laterally joined together at their uppermost point, and lying axially perpendicular to the vertical plane of the bicycle and between the two said triangles at their uppermost point, a pivot bushing, serving as a pivot bearing and axle for the pivot block of the front frame subassembly, and a rear frame connecting bolt, fastening, through an axial boring in the pivot bushing, laterally, the two said triangles together, with the pivot bushing as in between spacer, where, the said right triangle and left triangle each comprises a seat pillar with an upper end and lower end, a rear fork member with a front end and rear end, a seat strut with an upper end and lower end, a rear wheel receiving means defining a slot for a rear wheel axle and its axis, and an outer chainwheel axle hub element, this element being a member of the front chainwheel axle hub subassembly and where, so forming a first corner of each triangle, to each respective outer chainwheel axle hub element the respective seat pillar lower end and the respective rear fork member front end are fastened, and where, so forming a second corner of each triangle, to each respective rear wheel receiving means the respective rear fork member rear end and respective seat strut lower end are fastened, and where, so forming a third corner, the uppermost corner of each triangle, each respective seat strut upper end is fastened to each respective seat pillar upper end, and comprising further a rear wheel mounted between the two said triangles where, perpendicular to the vertical plane of the bicycle, the axis of the axle of the rear wheel lies inside of each rear frame triangle, and each slot of each respective rear wheel receiving means lies also inside of each respective rear frame triangle, so that the rear wheel can be moved forward between the two triangles, the front chainwheel axle hub subassembly comprising coaxial mating members, where the lower frame members of the front frame subassembly, and the seat pillars and the rear fork members of the rear frame subassembly are connected, and where the front chainwheel axle hub subassembly comprises a left outer chainwheel axle hub element that is fastened to the seat pillar and rear fork member of the left triangle of the rear frame subassembly and a right outer chainwheel axle hub element that is fastened to the seat pillar and rear fork member of the right triangle of the rear frame subassembly, a left inner element that is fastened to the lower end of the left lower frame member, and a right inner element that is fastened to the lower end of the right lower frame member, and a middle element that is insertable between the right and left inner elements, where, by means of a seat in each bore in an inner side of each outer element, and a corresponding mating annular protrusion on an outer side of each inner element, and by means of a seat in each bore on an inner side of each inner element mating with, the diameter of the middle element, each outer element, with the thereto fastened respective seat pillar and rear fork member, and each inner element, with the thereto fastened respective lower frame member of the front frame subassembly, and the middle element are coaxially assembled, whereby a stable load carrying joint is created, that however is easy to assemble and disassemble, and where only a small axial force is needed to hold the subassembly together and, where to fold the bicycle, the rear wheel is within the rear frame subassembly translated to a forward position, and then, the front frame subassembly and the rear frame subassembly are turned into each other about their common pivot bushing axis, whereby as the subassemblies are turned, the lower frame members of the front frame subassembly come between the two seat pillars and the two rear fork members, and the rear wheel comes between the two front frame lower frame members and then between the two front frame upper frame members, and whereby the inner elements of the lower frame members come approximately between the two rear wheel receiving means, until the rear wheel touches the lower end of the front fork hub, where then, in this end position, the distance from the axis of the rear wheel axle to the axis of the pivot block and to the axis through the rear wheel receiving means is each approximately that of the rear wheel radius, and to the axis through the front chainwheel axle hub approximately that of the rear wheel radius minus the front chainwheel radius.

2. A folding bicycle assembly as claimed in claim 1, wherein said assembly further comprises, between the rear wheel receiving means and the seat pillar of each respective rear frame triangle, parallel to the vertical plane of the bicycle, a slotted rear wheel guide, where the slot is a continuation of the slot in the rear wheel receiving means, along which the rear wheel axle, with the rear wheel, can be translated, when the bicycle is folded or unfolded.

3. A folding bicycle assembly as claimed in claim 2, where the rear wheel guides, in combination with the rear wheel fastened tightly to the guides in the forward position, hold the two rear frame triangles together, when the lower frame members with each corresponding inner element of the front chainwheel axle hub subassembly are separated from the rear frame subassembly.

4. A folding bicycle assembly as claimed in claim 1, wherein said assembly further comprises a rear wheel with a coaster brake arm, and a glide bushing captively fastened in the slot of the left rear wheel guide, but rigidly mounted to the brake arm, in such a way that the brake arm can slide along with the rear wheel, when the rear wheel is translated forward or backwards.

5. A folding bicycle assembly as claimed in claim 1, wherein said assembly further comprises, two detent blocks, mounted on the inner side of each outer element of the front chainwheel axle hub subassembly, each defining a semicircular socket whose radius is equal to the largest radius of each respective inner element of the chainwheel axle hub subassembly, whereby when by unfolding the bicycle, just before engagement, the respective inner elements contact each respective detent block, and by turning the front frame subassembly and rear frame subassembly, with respect to one another, further apart, the resistance offered by the lower frame members is overcome and each respective inner element snaps into each respective socket of the corresponding detent block, and where further, an outward axial preloading with respect to the inner elements of the lower frame members, forces each respective inner element axially into each respective outer element, whereby a rigid connection between the front frame subassembly and rear frame subassembly is established.

6. A folding bicycle assembly as claimed in claim 1, wherein said assembly further comprises a front chainwheel subassembly that is mounted in the right outer chainwheel axle hub element, and a left crank arm subassembly that is mounted in the left outer chainwheel axle hub element, where these two subassemblies, when bolted together by means of a chainwheel axle hub connecting bolt, hold axially the front chainwheel axle hub subassembly together, in that said bolt pulls, through a distance ring on the left crank arm subassembly and through an axle of the front chainwheel subassembly, an inner ring of a ball bearing of the left crank arm subassembly and an inner ring of a ball bearing of the front chain wheel subassembly together, which in turn, through the balls of the two bearings, pull the outer rings of the bearings together, and thereby the left and right outer chainwheel axle hub elements together, and since the diameter of the axle inside of the front chainwheel axle hub subassembly is smaller than the inside diameter of the said hub subassembly, the rotating member of the two mated subassemblies have contact only with the inner rings of the ball bearings.

7. A folding bicycle assembly as claimed in claim 1, wherein said assembly further comprises a front chainwheel subassembly, where by means of a ball bearing of said subassembly mounted in the right outer chainwheel axle hub element, the front chainwheel subassembly is as a turnable unit fastened to the bicycle frame.

8. A folding bicycle assembly as claimed in claim 1, wherein said assembly further comprises a front chainwheel subassembly and a left crank arm subassembly where, to establish a turn-fast connection, the axles of the two subassemblies are joined together by means of a radial tooth connection, and by means of the chainwheel axle hub connecting bolt, the two axles are axially bolted together.

9. A folding bicycle assembly as claimed in claim 1, wherein said assembly further comprises a front chainwheel subassembly, whose crank arm turn-fast fastened to the front chainwheel subassembly, can be loosened from said subassembly, and when loosened, by means of a hinge arrangement with the front chainwheel subassembly, the said crank arm and its pedal, can be turned about an axis parallel to the long axis of the crank arm, 90°, so that the principle plane of the pedal lies parallel to the vertical plane of the bicycle.

10. A folding bicycle assembly as claimed in claim 1 wherein said assembly further comprises a chainholder mounted on the right side of the bicycle frame in the vicinity of the rear wheel receiving means, whereby, when the rear wheel is, from its forward stowed position, translated to the operable position, a bicycle drive chain is held in such a position by the chain holder, so that the drive chain in position 'ready for operation', is automatically caught by a rear wheel sprocket, and in the operable mode, the chainholder does not contact the drive chain.

11. A folding bicycle assembly as claimed in claim 1, wherein said assembly further comprises a front frame subassembly where each of the upper frame members and each of the lower frame members are of a rectangular cross section.

12. A folding bicycle assembly as claimed in claim 1, wherein said assembly further comprises a front frame subassembly, where, the two lower frame members are fastened to the front fork hub by means of a pivotable connection, in such a way that the axis of rotation of the fastened pair is perpendicular to the vertical plane of the bicycle.

13. A folding bicycle assembly as claimed in claim 1, wherein said assembly further comprises a front frame subassembly where the upper end of each lower frame member is removably fastened to the front fork hub, and lower end of each lower frame member is fastened to each corresponding outer element of the front chainwheel axle hub subassembly in such a way, that the lower frame members can be turned about an axis coincident with the front chainwheel axle, when the upper ends of the lower frame members are free from the front fork hub.

14. A folding bicycle assembly as claimed in claim 1, wherein said assembly further comprises a handle bar assembly mounted in the front fork of the bicycle as known in the art, and where, by means of two brake lining elements, the movable right and left handle bar members are held fast in any desired position, and where the force required to move the left and right handle bar members up or down, is adjustable, and where further, when the handle bar members are folded in the down position against each respective front frame upper member, the front fork is blocked from turning.

15. A folding bicycle as claimed in claim 1, wherein said assembly comprises a front frame subassembly, where the two upper frame members, are, from the upper end of the front fork hub, directed rearwards and downwards and then rearwards and upwards, and are then connected to the pivot block, thereby forming a front frame subassembly, suitable for a lady's bicycle.

16. A folding bicycle assembly as claimed in claim 1, wherein said assembly comprises a front frame subassembly, where, the two upper frame members are fastened to the front fork hub by means of a pivotable connection, in such a way that the axis of rotation of the fastened pair is perpendicular to the vertical plane of the bicycle.

* * * * *